UNITED STATES PATENT OFFICE.

EDWARD H. BARRETT, OF MINNEAPOLIS, MINNESOTA.

TILE-PAVEMENT.

SPECIFICATION forming part of Letters Patent No. 347,861, dated August 24, 1886.

Application filed July 28, 1885. Serial No. 173,197. (No specimens.)

*To all whom it may concern:*

Be it known that I, EDWARD H. BARRETT, a citizen of the United States, residing at Minneapolis, in the county of Hennepin and State of Minnesota, have invented certain Improvements in Tile-Pavements, of which the following is a specification.

My invention relates particularly to improvements in pavements or floors for public and private buildings, and especially to floors for corridors, halls, and vestibules. Heretofore these floors have often been composed of tiles of marble and slate; and it is the object of my invention to provide a floor-tile that shall form a floor having the appearance largely of a tile-floor of marble and slate, but which shall be both cheaper and more durable than the marble and slate floor, and capable of taking a higher degree of polish.

In carrying out my invention I manufacture a tile that is composed of cement and other materials, and with this tile I form all kinds of inside pavements or floors.

In making this tile I take the following ingredients or materials in about the proportions specified, to wit: French or Portland cement, four parts; pulverized granite, two parts; crushed jasper, two parts; fine silicious sand, one part. These materials are thoroughly mixed. I then make a mixture of alum, one-half pound; sesquioxide of iron, three pounds; carbonate of potash, two pounds, in fifteen gallons of water. The mixture of cement and other materials above-mentioned are then thoroughly incorporated with this second mixture, and the whole is mixed or combined by tamp or machine. This composition is then made into tiles of any desired form or size by being placed in suitable molds and subjected to powerful pressure until completely united. The tiles are then removed from the molds and submerged in a warm bath of silicate of soda or glass. These tiles, when of sufficient age, become very hard, possessing in a large degree the properties of granite, and like granite being capable of taking a highly-polished surface.

In making floors I generally lay a foundation composed of cement and sharp clean sand, dampened with water. This foundation is tamped down and its upper surface is made level and smooth. While the base is still damp I lay the tiles thereon and press them down solidly onto but not into the base, thereby making a firm and solid floor. All of the tiles for any floor are of uniform thickness.

These tiles may be made of any desired color, and of rectangular, hexagonal, or other shape.

I claim as my invention—

1. A floor-tile composed of cement, granite, jasper, and sand, substantially as described.

2. A floor having a tamped foundation of cement and sand and a layer of cement tiles pressed firmly down on said foundation, substantially as described.

3. The within method of forming a floor-tile, consisting in first mixing cement, pulverized granite, crushed jasper, and sand, then saturating said mixture with a mixture of alum, sesquioxide of iron, and carbonate of potash, then molding the mixture and afterwards submerging the tile in a warm bath of silicate of soda or glass, substantially as described.

4. The within method of forming a floor-tile, consisting in first mixing cement, pulverized granite, crushed jasper, and sand, then incorporating said mixture with alum, sesquioxide of iron, and carbonate of potash, and then molding the composition, substantially as described.

In testimony whereof I have hereunto set my hand this 11th day of July, 1885.

EDWARD H. BARRETT.

In presence of—
A. C. PAUL,
JAS. E. WOODFORD.